US007929813B2

(12) United States Patent
Doerr et al.

(10) Patent No.: US 7,929,813 B2
(45) Date of Patent: Apr. 19, 2011

(54) QAM OPTICAL MODULATORS

(75) Inventors: Christopher Richard Doerr, Middletown, NJ (US); Peter J. Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 34 days.

(21) Appl. No.: 12/586,639

(22) Filed: Sep. 25, 2009

(65) Prior Publication Data

US 2010/0111466 A1 May 6, 2010

Related U.S. Application Data

(62) Division of application No. 12/006,194, filed on Dec. 31, 2007, now Pat. No. 7,636,501.

(51) Int. Cl.
*G02F 1/035* (2006.01)
*G02F 1/21* (2006.01)

(52) U.S. Cl. ............ 385/3; 359/276; 359/577; 359/578

(58) Field of Classification Search ...... 385/3; 359/276, 359/577–578
See application file for complete search history.

(56) References Cited

U.S. PATENT DOCUMENTS 7,068,881 B2 6/2006 Yoo ................................ 385/31
2004/0170351 A1 9/2004 Fishman et al. .................. 385/3

OTHER PUBLICATIONS

R. Griffin, et al., "Integrated DQPSK Transmitter for Dispersion-Tolerant And Dispersion-Managed DWDM Transmission", *Optical Fiber Communication Conference*, Atlanta, GA., 2003, Paper FP6., 2 pages.

K. Higuma, et al. "A Bias Condition Monitor Technique For the Nested Mach-Zehnder Modulator", *IEICE Electronics Express*, vol. 3, 2006, pp. 238-242.

L. Zhang et al., "Low-Voltage High-Speed Traveling Way InGaAsP-InP Phase Modulator", *IEEE Photon. Technol. Lett.*, vol. 16, Aug. 2004, pp. 1831-1833.

H.N. Klein, et al., "1.55 μm Mach-Zehnder Modulators on InP for Optical 40/80 Gbit/s Transmission Networks", *Integrated Photonics Research M*, Princeton, NJ., 2006, Paper TuA2.4., pp. 171-173.

R.G. Walker, "High-Speed III-V Semiconductor Intensity Modulators", *IEEE J. Quantum Electron.*, vol. 27, No. 3, Mar. 1991, pp. 654-667.

H. Kawanishi, et al., "EAM-Integrated DFB Laser Modules With More Than 40 GHz Bandwidth", *IEEE Photon. Technol. Lett.*, vol. 13, Sep. 2001, pp. 954-956.

I. Kang, "Interferometric Operation Of An Electroabsorption Modulator for PSK Modulation and OOK Modulation With Performance Enhancements", *European Conf. Opt. Comm.*, Cannes, France, 2006, Paper We3.P.59., 2 pages.

Takahide Sakamoto, et al., "50-Gb/s 16 QAM by a quad-parallel Mach-Zehnder modulator," *European Conference on Optical Communication*, paper PD 2.8, Berlin, Sep. 2007, 2 pages.

C.R. Doerr, et al., "Compact EAM-Based InP DQPSK Modulator and Demonstration at 80 Gb/s," in *National Fiber Optic Engineers Conference*, Anaheim, CA, Mar. 25, 2007, *OSA Technical Digest Series* (*CD*) (*Optical Society of America*, 2007), paper PDP33, 3 pages.

(Continued)

*Primary Examiner* — Jerry T Rahll
(74) *Attorney, Agent, or Firm* — John F. McCabe

(57) ABSTRACT

An exemplary optical modulator includes an interferometer. The interferometer includes an input optical coupler, an output optical coupler, and two or more controllable optical waveguides. Each controllable optical waveguide connects the input optical coupler to the output optical coupler and has an electro-absorption modulator along a segment thereof. Two of the controllable optical waveguides are connected to transmit to an output of the output optical coupler light of substantially different maximum amplitude.

7 Claims, 11 Drawing Sheets

10A
11
EAM
24
26
20
S
18
15
EAM
18
14
EAM
S
22
28
I
29

OTHER PUBLICATIONS

C.R. Doerr, et al., "Compact, high-speed, InP DQPSK modulator," *IEEE Photonics Technology Letters*, vol. 19, No. 15, (Aug. 1, 2007) pp. 1184-1186.

I. Kang, "Phase-shift-keying and on-off-keying with improved performances using electroabsorption modulators with interferometric effects," *Optics Express*, vol. 15, No. 4, (Feb. 19, 2007), pp. 1467-1473.

U.S. Appl. No. 11/651,824, filed Jan. 10, 2007, C.Doerr.

QAM OPTICAL MODULATORS

This is a divisional of application Ser. No. 12/006,194, filed Dec. 31, 2007 now U.S. Pat. No. 7,636,501.

BACKGROUND

1. Field of the Invention

The invention relates generally to optical transmission apparatus and methods and more particularly, to optical modulators and optical modulation methods.

2. Discussion of the Related Art

This section introduces aspects that may help facilitate a better understanding of the inventions. Accordingly, the statements of this section are to be read in this light and are not to be understood as admissions about what is prior art or what is not prior art.

There is a strong interest in optical communication systems that transmit data at high rates. While high transmission rate can be achieved by multiplexing a data stream onto different optical channels in parallel, this simple technique tends to provide a low spectral efficiency. The spectral efficiency may be increased by relying on larger symbol constellations to modulate the data stream onto the optical carrier, e.g., a quadrature phase shift keyed (QPSK) constellation. Some larger symbol constellations can be used by optical modulators in which optical phase shifter(s) are constructed to provide a range of phase shifts. Nevertheless, some such optical phase shifters are complicated to implement due to nonlinearities and/or weak electro-optical responses.

SUMMARY

Various embodiments provide optical modulators and methods of optical modulation in accordance with quadrature amplitude modulation (QAM) schemes. The QAM schemes have constellations with symbols of more than one magnitude. Some embodiments provide optical modulators that are compact integrated optical devices.

One embodiment features an optical modulator that includes an interferometer. The interferometer includes an input optical coupler, an output optical coupler, and two or more controllable optical waveguides. Each controllable optical waveguide connects the input optical coupler to an output of the output optical coupler and has an electro-absorption modulator along a segment thereof. Two of the controllable optical waveguides are connected to transmit to the output of the output optical coupler light of substantially different maximum amplitude.

In some embodiments of the optical modulator, one of the controllable optical waveguides is connected to transmit a maximum light amplitude to the output of the output optical coupler that is between 1.5 and 2.5 times a maximum light amplitude that another of the controllable optical waveguides is connected to transmit thereto or is between 1.8 and 2.2 times a maximum light amplitude that another of the controllable optical waveguides is connected to transmit thereto. In some such embodiments, the output optical coupler is configured to interfere light from two of the controllable optical waveguides at the optical output of the output optical coupler with a relative phase whose magnitude is less than 20 degrees.

In some other embodiments of the optical modulator, the output optical coupler is configured to interfere at the optical output of the output optical coupler light from a first of the controllable optical waveguides with light from a second of the controllable optical waveguides with a relative phase of between 160 degrees and 200 degrees or with a relative phase of between 160 degrees and 200 degrees. In some such embodiments, the first of the controllable optical waveguides is configured to transmit a maximum light amplitude to the optical output of the output optical coupler that is between 1.5 and 2.5 times a maximum light amplitude that the second of the optical waveguides is configured to transmit to the output of the output optical coupler. In some other such embodiments, the output optical coupler is configured to interfere light from a third of the controllable optical waveguides with light from a fourth of the controllable optical waveguides. In some embodiments, the optical modulator also includes an electronic controller.

The electronic controller is configured to cause each electro-absorption modulator to be in either an ON state or an OFF state. Each electro-absorption modulator substantially blocks incident light in the OFF state and substantially transmits incident light in the ON state.

In various of the above embodiments of optical modulators, the interferometer may include another optical waveguide without an optical switch or controllable optical modulator there along. The other optical waveguide also connects the input optical coupler to the output optical coupler.

Another embodiment features an method. The method includes, in each of a series of time intervals, modulating a data bit onto each light beam of a plurality of mutually coherent light beams via a binary amplitude modulation scheme. The method also includes optically interfering light from the modulated mutually coherent light beams to produce an output light beam. The interfered light from two of the modulated mutually coherent light beams has substantially different maximum amplitude.

In some embodiments, the method is such that the maximum amplitude of the interfered light of one of the modulated mutually coherent light beams is between 1.5 and 2.5 times the maximum amplitude of the interfered light from another of light beams. In some such embodiments, the interfering includes interfering the modulated mutually coherent light beams with another mutually coherent light beam having a substantially temporally constant intensity. In some such embodiments, the interfering includes interfering the light of the two of the mutually coherent light beams with a relative phase whose magnitude is less than 20 degrees.

In some other embodiments, the interfering includes interfering the light of first and second of the mutually coherent light beams with a relative phase of between 160 degrees and 200 degrees. In some such embodiments, the interfering also includes interfering the light of third and fourth of the mutually coherent light beams with a relative phase whose magnitude is less than 20 degrees.

In various of the above embodiments, the method may include transmitting light of each light beam of the plurality through a corresponding one of the controllable optical waveguides in both forward and backwards directions.

Another embodiment features another optical modulator. The optical modulator includes an interferometer having an optical coupler, controllable optical waveguides, and reflectors. Each reflector corresponds to one of the controllable optical waveguides. Each controllable optical waveguide is configured to receive light from and deliver light to the optical coupler and has an electro-absorption modulator along a segment thereof. Each reflector is located to reflect light back into the corresponding one of the controllable optical waveguides in response to receiving light there from. Two of the controllable optical waveguides are configured to transmit to the optical output of the optical coupler light of substantially different maximum amplitude.

In some embodiments of the optical modulator, one of the controllable optical waveguides is connected to transmit a maximum light amplitude to the optical output of the optical coupler that is between 1.5 and 2.5 or between 1.8 and 2.2 times a maximum light amplitude that another of the controllable optical waveguides is connected to transmit thereto.

In some embodiments of the optical modulator, the optical coupler is configured to interfere at its optical output light from two of the controllable optical waveguides with a relative phase whose magnitude is less than 20 degrees.

In some embodiments of the optical modulator, the optical coupler is configured to interfere at its optical output light from a first of the controllable optical waveguides with light from a second of the controllable optical waveguides with a relative phase of between 160 degrees and 200 degrees.

In some embodiments, the optical modulator further includes an electronic controller configured to cause each electro-absorption modulator to be in either an ON state or an OFF state. Each electro-absorption modulator substantially blocks incident light in the OFF state and substantially transmits incident light in the ON state.

BRIEF DESCRIPTION OF THE FIGURES

In the Figures, similar reference numbers refer to features having substantially similar functions and/or structures.

Figure 1:
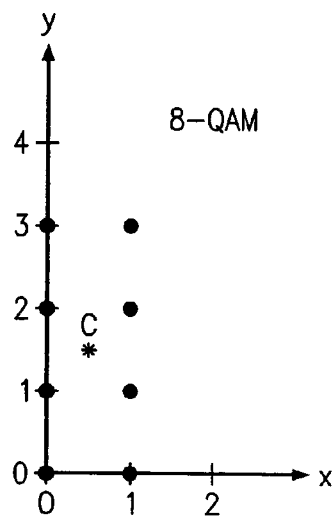
FIG. 1 illustrates one form of the 8-QAM symbol constellation.
Figure 2A:
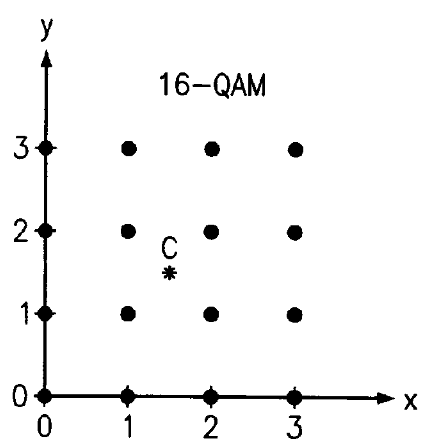
FIGS. 2A and 2B illustrate two forms of 16-QAM symbol constellations.
Figure 2B:
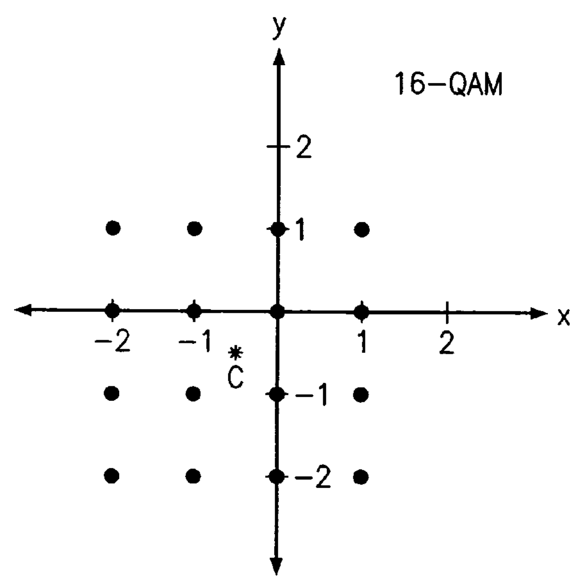
Figure 3:
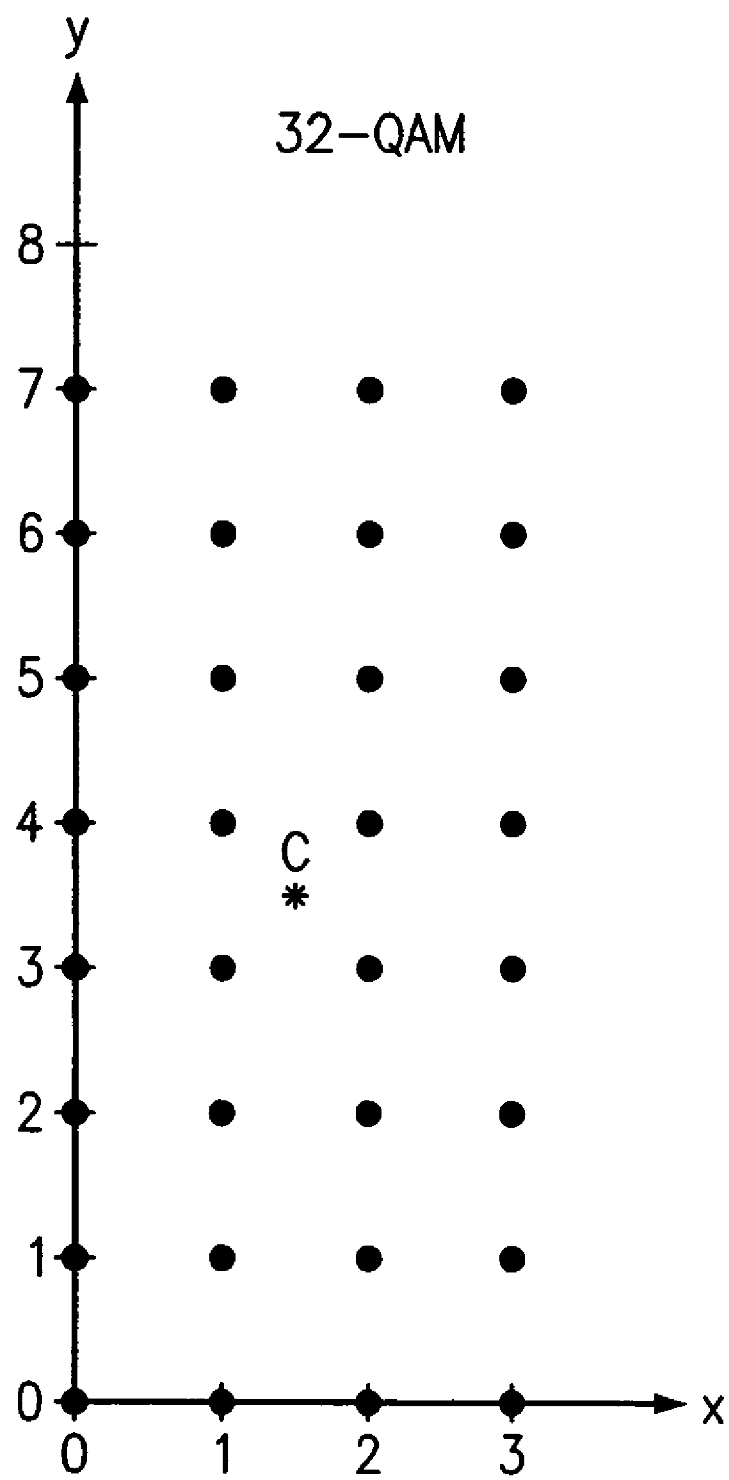
FIG. 3 illustrates one form of the 32-QAM symbol constellation.

In some of the Figures, relative dimensions of some features may be exaggerated to more clearly illustrate the structures shown therein.

While the Figures and the Detailed Description of Illustrative Embodiments describe some embodiments, the inventions may have other forms and are not limited to those described in the Figures and the Detailed Description of Illustrative Embodiments.

DETAILED DESCRIPTION OF ILLUSTRATIVE EMBODIMENTS

Various embodiments provide for optical modulators that are based on multi-arm interferometers. The optical modulators modulate data onto an optical carrier via quadrature amplitude modulation (QAM) schemes for constellations having 4 or more symbols or signal points. The 8-QAM, first 16-QAM, second 16-QAM, and 32-QAM constellations of FIGS. 1, 2A, 2B, and 3, respectively, are examples with eight or more signal points (i.e., black dots). In these QAM constellations, the in-phase and quadrature-phase amplitudes of a QAM symbol are proportional to respective x and y coordinates of the corresponding signal point. Herein, suitable QAM constellations may be centered about (0, 0) or about another point, C, e.g., as in FIGS. 1, 2A, 2B, and 3. If a constellation's center, i.e., its center of mass, is at the point (0, 0), the time-averaged transmitted power is usually approximately minimized during transmission.

The QAM constellations of FIGS. 1, 2A, 2B, and 3 illustrate only some of the constellations that can be used by embodiments of optical modulators and modulation schemes described herein. Based on this disclosure, a person of skill in the art would understand how to make and operate optical modulators operating according to other QAM constellations.

FIGS. 4, 5, 6, 7, 8, and 9 illustrate structures for first and second 8-QAM optical modulators 10A, 10B, first and second 16-QAM optical modulators 10C, 10D, and first and second 32-QAM optical modulators 10E, 10F. Each of the QAM optical modulators 10A-10F may be fabricated as an integrated planar optical device.

Each optical modulator 10A-10F includes a controllable interferometer, I, i.e., a generalized Mach-Zehnder interferometer. Each of the controllable interferometers, I, has a parallel set of two or more controllable optical waveguides 11, 12, 13, 14, 15, 16, an input optical coupler 20, and an output optical coupler 22, and optionally has a non-controllable or fixed optical waveguide 17. Each controllable optical waveguide 11-16 optically connects the input optical coupler 20 to the output optical coupler 22. Each controllable optical waveguide 11-16 has an electro-absorption modulator (EAM) located along a segment thereof. The optional non-controllable or fixed optical waveguide 17 optically connects the input and output optical couplers 20, 22, but does not include an EAM or an optical modulator along a segment thereof. The input and output optical couplers 20, 22 may be, e.g., optical star couplers, multi-mode interference couplers, or concatenations of directional optical couplers. The input optical coupler distributes part of the light received from an optical input 24 among the optical waveguides 11-17. The optical input 24 receives light from a coherent light source 26, e.g., a laser, via an input optical waveguide. The output optical coupler 22 distributes light received from the optical waveguides 11-17 to an optical output 28. The optical output 28 may transmit a modulated optical carrier, e.g., to an optical amplifier and/or an optical transmission fiber.

The controllable and optional fixed optical waveguides 11-17 receive mutually coherent light beams from the input optical coupler 20 and output mutually coherent, light beams to the output optical coupler 22. Each controllable optical waveguide 11-16 has a transmissivity that is controlled by its EAM. Each EAM is temporally controlled by control voltages received from an electronic controller 29 and is operated so that the corresponding controllable optical waveguide 11-16 will output a temporally modulated light beam whose form is responsive to the control voltages. The control voltages are received, e.g., via conducting metal control lines, which are indicated by dashes in FIGS. 4-9.

The controllable and optional fixed optical waveguides 11-17 are configured so that each optical modulator 10A-10F produces the signal points of a preselected QAM constellation during operation.

First, at least one of the controllable optical waveguides 15 is configured to transmit a substantially larger maximum light amplitude to the optical output 28 of the output optical coupler 20 than one or more others of the controllable optical waveguides 11, 14. For example, the controllable optical waveguide 15 transmits, in its substantially transmitting state, a light amplitude that is near twice, e.g., between 1.5 times and 2.5 times, the light amplitude transmitted thereto by each of the other controllable optical waveguides 11, 14, i.e., in their transmitting states. Preferably, the controllable optical waveguide 15 transmits to the optical output 28, in its substantially transmitting state, a light amplitude that is between 1.8 and 2.2 times the light amplitude transmitted thereto by each of the one or more other controllable optical waveguides 11, 14 in their transmitting states. To that end, the input and/or output of the controllable optical waveguide 15 may have larger area(s) than the inputs and/or outputs of the controllable optical waveguides 11, 14. In addition, the input and/or output of the controllable optical waveguide 15 may be located nearer to the center(s), S, of the arc-shaped output surfaces of the optical couplers 20, 22 than the inputs and/or outputs of the controllable optical waveguides 11, 14 in embodiments where the optical couplers 20, 22 are optical star couplers with free space optical propagation regions and such arc-shaped output surfaces. Differences in the values of the couplings of the individual optical waveguides 11-17 to the input and/or output optical couplers 20, 22 and in the propagation losses in the individual optical waveguides 11-17 combine to produce the relative differences in the maximum light amplitudes that the optical waveguides 11-17 transmit to the optical output 28 of the output optical coupler 22.

Herein, light amplitudes are defined to be positive quantities.

Second, the light from the controllable and optional fixed optical waveguides 11-17 interferes at the optical output 28 of the output optical coupler 22 with preselected relative phases. The relative phases are determined, e.g., by the relative optical path lengths of the optical waveguides 11-17 and the location of the optical output 28. For example, the controllable optical waveguides 11-16 may be organized into a first group, e.g., the controllable optical waveguides 11-13, and a second group, e.g., the controllable optical waveguides 14-16, so that light from the two groups interferes at the optical output 28 of the output optical coupler 22 with a first preselected relative phase. The first preselected relative phase may have, e.g., a magnitude of about +90 degrees. For example, the first preselected relative phase is in the range of 90°±20° and preferably is in the range of 90°±10°.

The optical path lengths of the individual controllable and optional fixed optical waveguides 11-17 may be separately adjusted through the geometrical layout of the optical waveguides 11-17 or optionally through fixed optical phase shifters 18 that are located along segments of a subset of the optical waveguides 11-17. In the later case, each phase shifter 18 is DC biased via a voltage applied to other metal electrical control lines (not shown) so that the corresponding optical waveguide 11-17 outputs light to the optical output 28 of the output optical coupler 22 with the appropriate phase relative to the light output thereto by the others of the optical waveguides 11-17.

Herein, phases are modular numbers that are defined up to an integer times 360 degrees. That is, a phase "P" is the same as a phase P+N·360° where N is any integer that does not have too large a magnitude.

Third, the electronic controller 29 modulates a stream of data bits onto the mutually coherent optical carrier in each controllable optical waveguide 11-16 by applying a corresponding temporal stream of control voltages to the EAM located along a segment of that controllable optical waveguide 11-16. The electronic controller 29 causes each of the EAMs to be in either an ON state or an OFF state during operation. For example, each EAM has a ratio of a transmitted light power in the OFF state to a transmitted light power in the ON state of 0.2 or less, and preferably, the ratio is 0.1 or less. Thus, each EAM is operated to substantially transmit or substantially block light in the corresponding optical waveguide 11-16, i.e., is operated according to a substantially On-Off keying modulation scheme. The EAMs may however, still transmit a fixed finite light power in their OFF states.

The optical modulators 10A-10F have internal EAMs rather than controllable phase shifters. Herein, an EAM modulates a light intensity in the corresponding controllable optical waveguide by applying an electric field across a segment of the optical waveguide. An EAM typically includes electrodes that apply electric field along the controlled segment of the corresponding controllable optical waveguide, e.g., a semiconductor segment. Along the controlled segment, the voltage applied to the EAM controls an optical absorption spectrum of the corresponding controllable optical waveguide.

As illustrated below, various specific embodiments are available for QAM optical modulators with some or all of the above-described features.

8-QAM Optical Modulators

Figure 4:
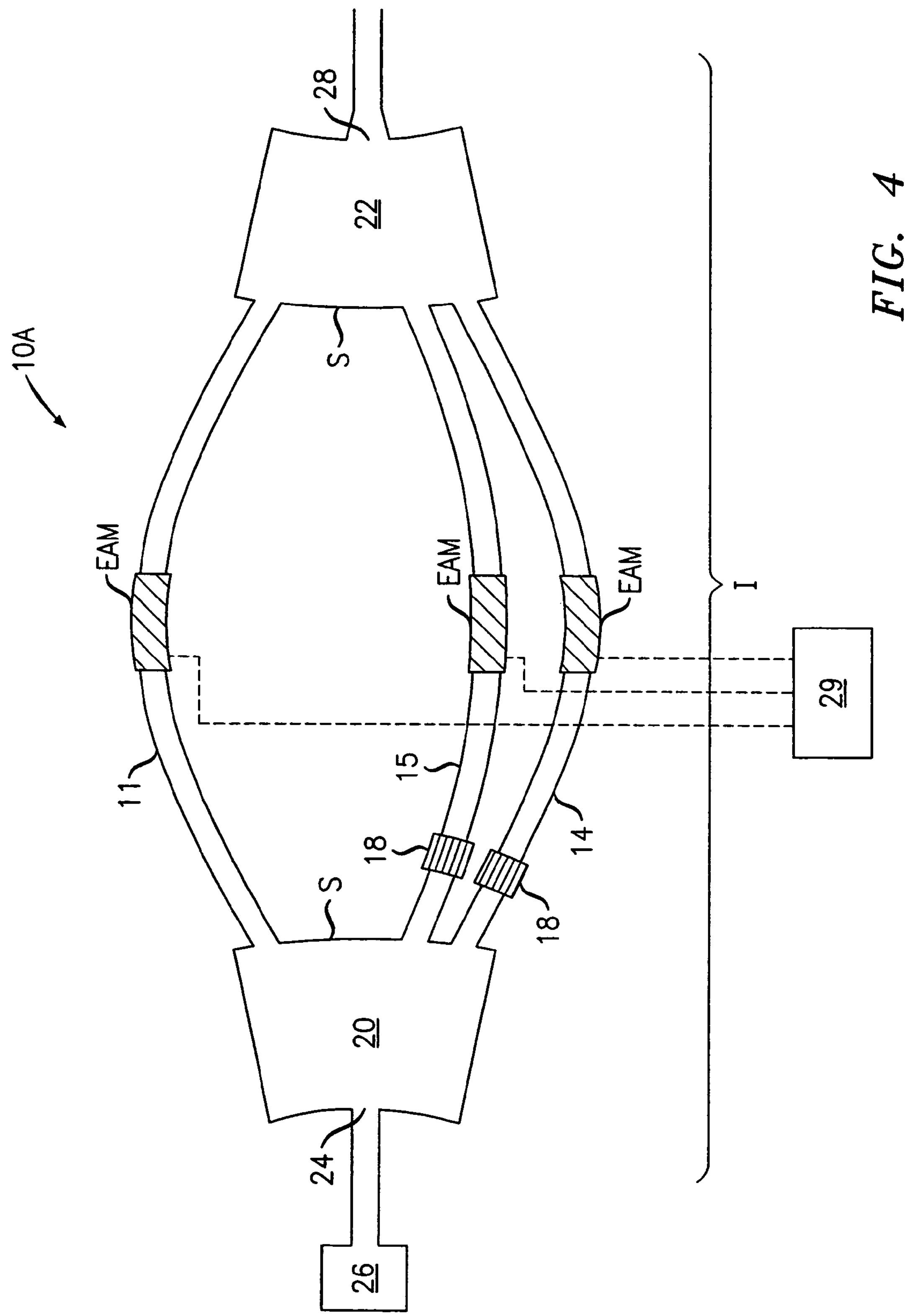
FIG. 4 is a top view of one embodiment of a 8-QAM optical modulator.
Figure 5:
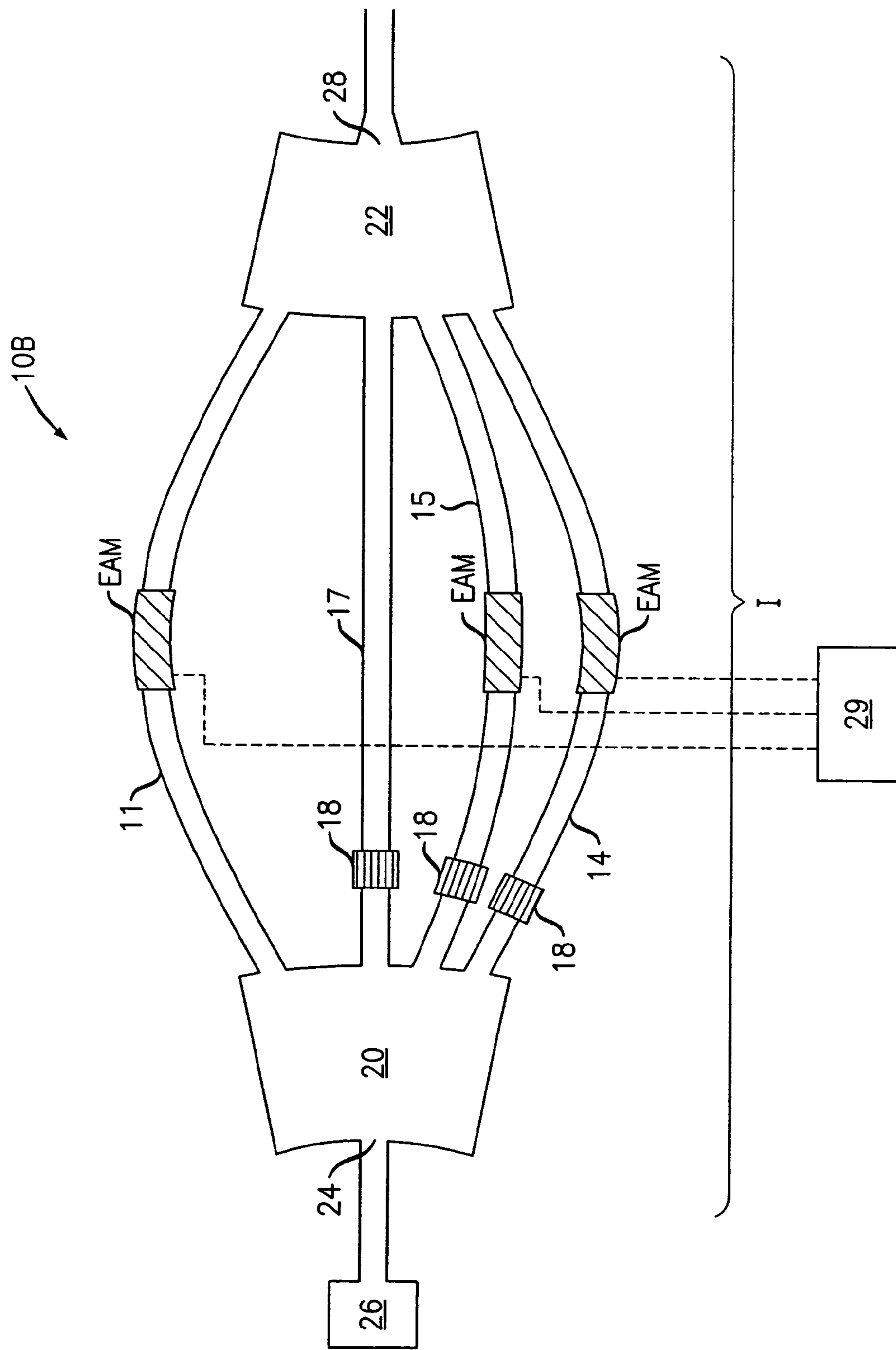
FIG. 5 is a top view of another embodiment of a 8-QAM optical modulator.

Referring to FIGS. 4-5, embodiments of the optical modulators 10A-10B modulate data onto an optical carrier according to 8-QAM constellations.

One such embodiment internally sets maximum light amplitudes and relative phases of interfered light as described below. With respect to light amplitudes, the controllable optical waveguide 15 is configured to transmit, i.e., in its transmitting state, to the optical output 28 of the optical coupler 22 a maximum light amplitude that is about twice the maximum light power transmitted thereto by each other controllable optical waveguide 11, 14, i.e., in their transmitting states. For example, in transmitting states, the ratio of the light amplitude that the controllable optical waveguide 15 transmits to optical output 28 of the output optical coupler 22 over the light amplitude that each other controllable optical waveguide 11, 14 transmits thereto is between 1.5 and 2.5 and is preferably between 1.8 and 2.2. With respect to the relative phases, light transmitted by the controllable optical waveguides 14, 15 interferes at the optical output 28 of the output optical coupler 22 with light transmitted by the controllable optical waveguide 11 with a first relative phase of about 90 degrees. For example, the first relative phase may be in the range of 90°±20° and preferably is in the range of 90°±10°. Also, the two controllable optical waveguides 14, 15 output light that interferes at the optical output 28 of the output optical coupler 22 with a second relative phase of about 0 degrees. For example, the second relative phase may be in the interval [−20°, +20°] and preferably is in the interval [−10°, +10°].

In the above embodiments, the optical modulators 10A, 10B of FIGS. 4 and 5 produce a signal point of an 8-QAM constellation for each state of the three EAMs. For the above embodiments of the optical modulator 10A, the x and the y coordinates of the signal points, i.e., in phase and quadrature phase light amplitudes, and the states of the three EAMs are related as shown in Table 1.

TABLE 1

| 8-QAM Optical modulator | (0, 0) | (0, 1) | (0, 2) | (0, 3) | (1, 0) | (1, 1) | (1, 2) | (1, 3) |
|---|---|---|---|---|---|---|---|---|
| EAM of waveguide 11 | OFF | OFF | OFF | OFF | ON | ON | ON | ON |
| EAM of waveguide 14 | OFF | ON | OFF | ON | OFF | ON | OFF | ON |
| EAM of waveguide 15 | OFF | OFF | ON | ON | OFF | OFF | ON | ON |

For the optical modulators 10B, the states of the EAMs produce the signal points of an 8-QAM constellation with a different center, C. For special configurations of the fixed optical waveguide 17, the center, C, of the 8-QAM constellation will be at or near (0, 0). In some such special configurations, the fixed optical waveguide 17 outputs a light amplitude that is about $(5/2)^{1/2}$ times the maximum light amplitude output by each lower power controllable optical waveguide 11, 14, i.e., in their ON states. For example, the fixed optical waveguide 17 may be configured to transmit to the optical output 28 of the output optical coupler 22, a light amplitude that is in the range of $(5/2)^{1/2}$±20% times the maximum light amplitude transmitted thereto by each low power controllable optical waveguide 11, 14 and is preferably in the range of $(5/2)^{1/2}$±10% times the maximum light amplitude transmitted thereto by each low power controllable optical waveguide 11, 14. In these special configurations, the fixed optical waveguide 17 outputs light that interferes, at the optical output 28 of the output optical coupler 22, with a relative phase of about arctan(3)+180 degrees with light output thereto by the controllable optical waveguide 11. For example, the relative phase may be in the range of 251.5°±20° and is preferably in the range of 251.5°±10°. In these special configurations, the optical modulator 10B typically generates a lower average optical power during operation than the optical modulator 10A, because the center of the 8-QAM constellation is nearer to (0, 0) for the optical modulator 10B.

In different embodiments, the relative lateral positions of the waveguides 11, 14, 15, 17 may be different. For example, the lateral outside-to-inside ordering of the waveguides 11, 14, 15, 17 in the region between the optical couplers 20, 22 may differ in different embodiments. In particular, the fixed optical waveguide 17 may not be near the center of the set of optical waveguides 11, 14, 15, 17.

Linear 4-QAM Optical Modulators

Some embodiments of 4-QAM optical modulators are constructed like the above embodiments of the modulators 10A-10B of FIGS. 4-5 except that the controllable optical waveguide 11 is absent. In these embodiments, the controllable optical waveguides 14, 15, and the optional fixed optical waveguide 17 transmit relative light amplitudes to the optical output 28 of the output optical coupler 22 as described above for the optical modulators 10A-10B. In addition, at the optical output 28 of the output optical coupler 22, the relative phases of interfered light from the controllable optical waveguides 14, 15, and the optional fixed optical waveguide 17 have the values described above for the optical modulators 10A-10B.

These embodiments of optical modulators produce linear 4-QAM constellations. In embodiments of such optical modulators that do not include the fixed optical waveguide 17, the x and y coordinates of signals points, i.e., in phase and quadrature phase light amplitudes, and the states of the two EAMs of the optical modulators are related as shown in Table 2.

TABLE 2

| 8-QAM Optical modulator | (0, 0) | (0, 1) | (0, 2) | (0, 3) |
|---|---|---|---|---|
| EAM of waveguide 14 | OFF | ON | OFF | ON |
| EAM of waveguide 15 | OFF | OFF | ON | ON |

Thus, the four signal points of the linear 4-QAM constellation form a line on the y-axis. In embodiments of such optical modulators that include the fixed optical waveguide 17, the 4-QAM constellation may be shifted to have a center, i.e., a center of mass, near or at the origin (0, 0).

16-QAM Optical Modulators

Figure 6:
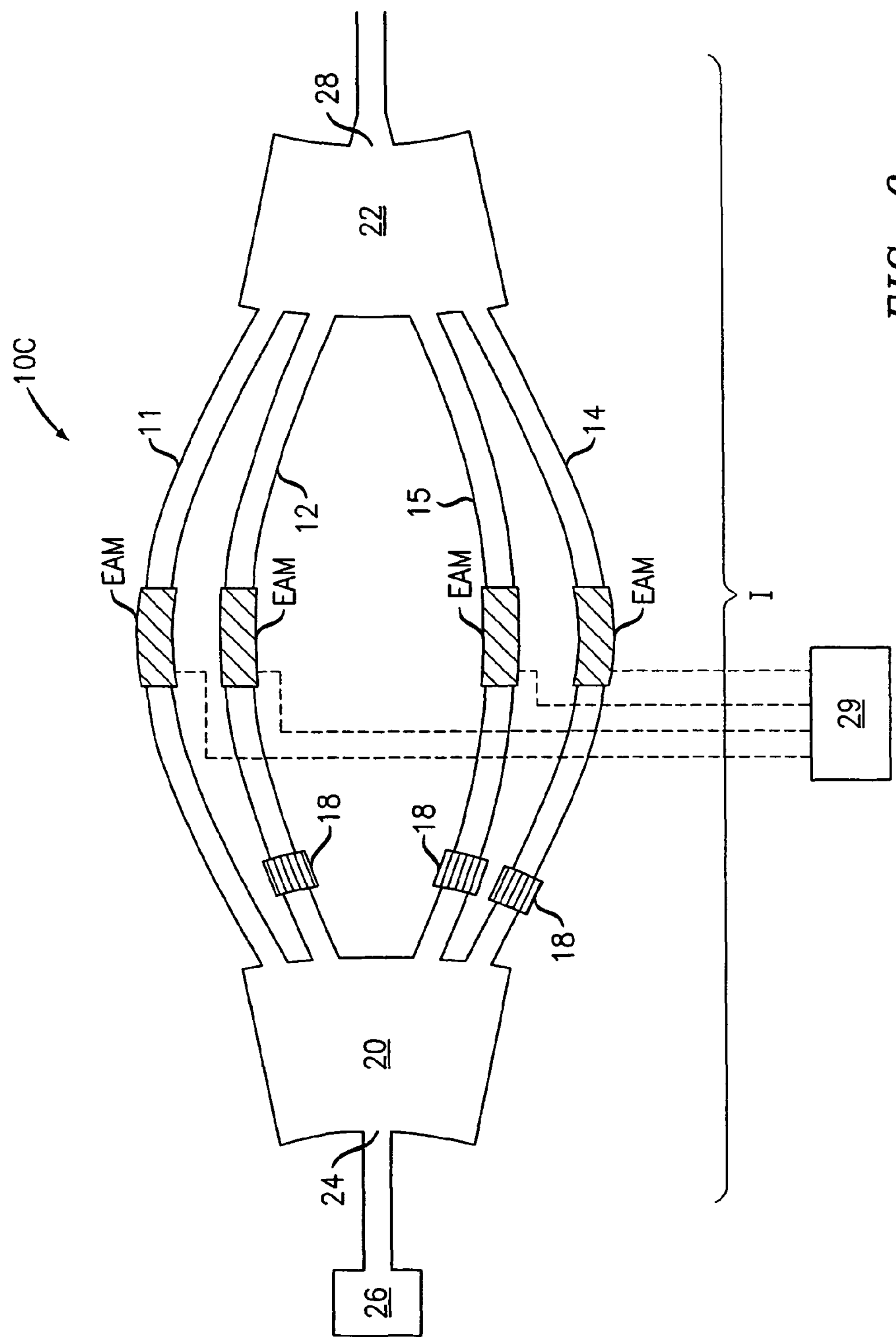
FIG. 6 is a top view of one embodiment of a 16-QAM optical modulator.
Figure 7:
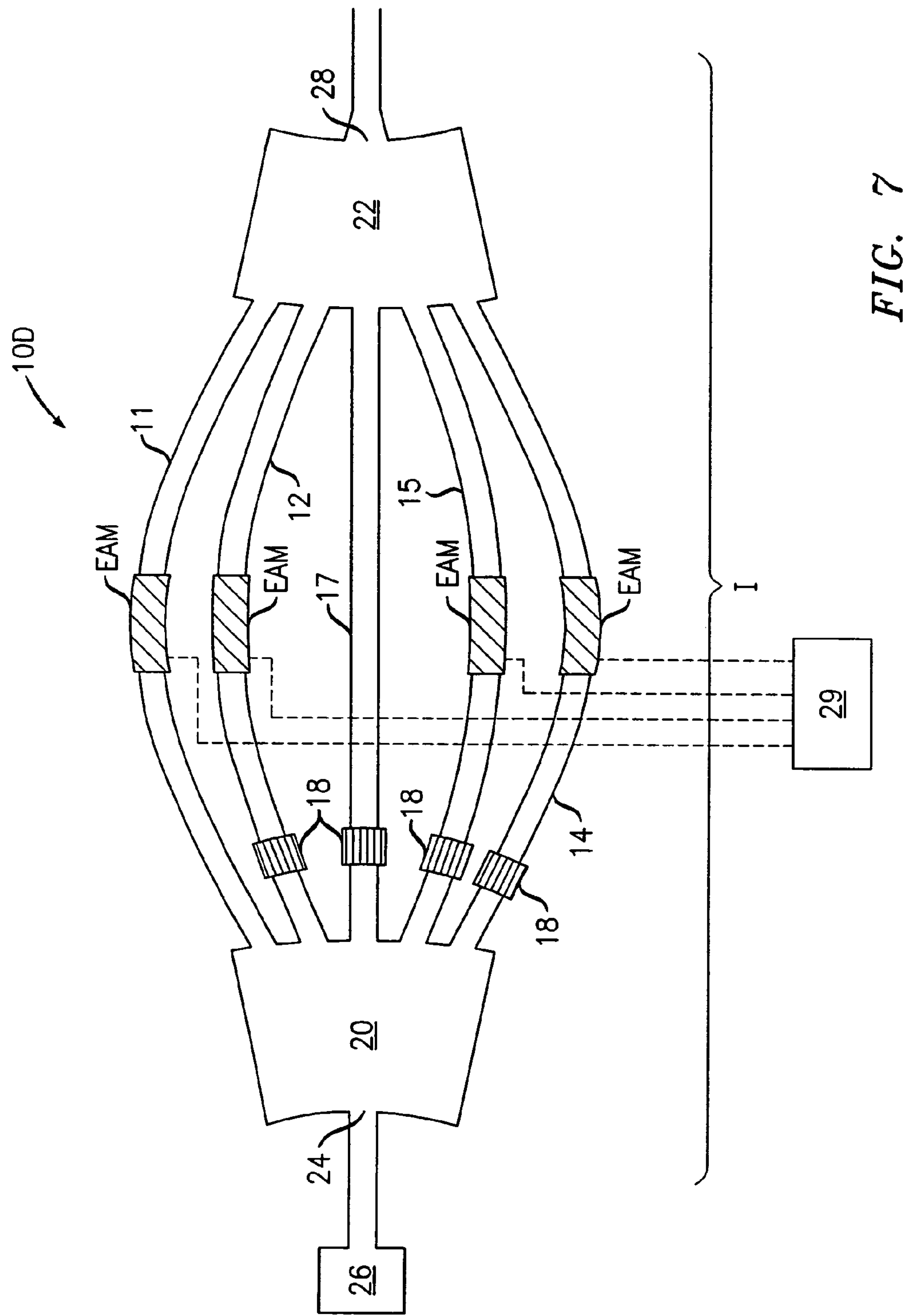
FIG. 7 is a top view of another embodiment of a 16-QAM optical modulator.

Referring to FIGS. 6-7, embodiments of the optical modulators 10C-10D modulate data onto an optical carrier according to 16-QAM constellations.

Example 1

First exemplary embodiments of the optical modulators 10C-10D set internal light amplitudes and relative phases between interfered light as described below. With respect to internal light amplitudes, each controllable optical waveguide 12, 15 of a first group is configured to transmit a maximum light amplitude to the optical output 28 of the output optical coupler 22 that is about twice the maximum light amplitude transmitted thereto by each controllable optical waveguide 11, 14 of a second group. For example, in their ON or substantially transmitting states, a ratio of the light amplitude transmitted to the optical output 28 of the output optical coupler 22 by the individual controllable optical waveguides 12, 15 of the first group over the light amplitude transmitted thereto by the individual controllable optical waveguides 11, 14 of the second group may be in the interval [1.5, 2.5] and preferably is in the interval [1.8, 2.2]. The differences in maximum light amplitudes transmitted to the optical output 28 of the output optical coupler 22 are due to differences in the couplings of the optical waveguides 11, 14, 12, 15 of the first and second groups to the input and/or output optical couplers 20, 22 in combination with any differences in propagation losses in the optical waveguides 11, 14, 12, 15. With respect to relative phases, light from the controllable optical waveguides 14, 15 of a third group interfere at the optical output 28 of the output optical coupler 22 with light from the controllable optical waveguides 11, 12 of a fourth group with a first relative phase of about 90 degrees. For example, the first relative phase may be in the range of 90°±20° and preferably is in the range of 90°±10°. Also, light from the controllable optical waveguides 14, 15 of the third group interferes at the optical output 28 of the output optical coupler 22 with a second relative phase of about 0 degrees. Finally, light from the controllable optical waveguides 11, 12 of the fourth group interferes at the optical output 28 of the output optical coupler 22 with a third relative phase of about 0 degrees. For example, the second and third relative phases may be in the interval [−20°, +20°] and preferable are in the interval [−10°, +10°].

In the first exemplary embodiment, the optical modulators 10C, 10D of FIGS. 6 and 7 produce a signal point of a 16-QAM constellation for each state of their four EAMs. For the above embodiments of the optical modulator 10C, the x and the y coordinates of the signal points of 16-QAM constellation of FIG. 2A and the states of the three EAMs are related as shown in Tables 3A and 3B.

TABLE 3A

| 16-QAM Optical modulator | x = 0 | x = 1 | x = 2 | x = 3 |
|---|---|---|---|---|
| EAM of waveguide 14 | OFF | ON | OFF | ON |
| EAM of waveguide 15 | OFF | OFF | ON | ON |

TABLE 3B

| 16-QAM Optical modulator | y = 0 | y = 1 | y = 2 | y = 3 |
|---|---|---|---|---|
| EAM of waveguide 11 | OFF | ON | OFF | ON |
| EAM of waveguide 12 | OFF | OFF | ON | ON |

For the optical modulator 10D, the states of the EAMs produce signal points of a 16-QAM constellation with a different center, C. For special configurations of the fixed optical waveguide 17, the center, C, of the 16-QAM constellation will be at or near (0, 0). In some such special configurations, the fixed optical waveguide 17 is configured to transmit a light amplitude to the optical output 28 of the output optical coupler 22 that is about $(9/2)^{1/2}$ times the maximum light amplitude transmitted thereto by each of the lower power controllable optical waveguides 11, 14, i.e., in their ON or substantially transmitting states. For example, the fixed optical waveguide 17 may be configured to transmit to the optical output 28 of the output optical coupler 22, a light amplitude that is $(9/2)^{1/2}\pm20\%$ times the light amplitude transmitted thereto by each low power controllable optical waveguide 11, 14 in its ON state, and preferably, the fixed optical waveguide 17 transmits thereto a light amplitude that is $(9/2)^{1/2}\pm10\%$ times the light amplitude transmitted thereto by each low power controllable optical waveguide 11, 14 in its ON state. In these special configurations, the fixed optical waveguide 17 transmits light that interferes, at the optical output 28 of the output optical coupler 22, with a relative phase of about 225 degrees with light transmitted thereto by the controllable optical waveguides 11, 12 of the fourth group. For example, the relative phase may be in the range of 225°±20° and is preferably in the range of 225°±10°. In these special configurations, the optical modulator 10D typically generates a lower average optical power during operation than the optical modulator 10C.

Example 2

Second exemplary embodiments of the optical modulators 10C-10D set internal light amplitudes and relative phases between interfered light as described below. With respect to light amplitudes, the controllable optical waveguides 11, 12, 14, 15 transmit, i.e., in their ON states or substantially transmitting states, maximum light amplitudes to the optical output 28 of the output optical coupler 22 whose ratios have the values described above for the first exemplary embodiments. With respect to relative phases, light from the low power controllable optical waveguides 11, 14 interferes at the optical output 28 of the output optical coupler 22 with a first relative phase of about 90 degrees. Also, light from the high power controllable optical waveguides 15, 12 interferes at the optical output 28 of the output optical coupler 22 with a second relative phase of about 90 degrees. For example, the first and second relative phases may be in the range of 90°±20° and preferably are in the range of 90°±10°. Also, light from the controllable optical waveguides 11, 12 of a third group interferes at the optical output 28 of the output optical coupler 22 with a third relative phase of about 180 degrees, and light from the controllable optical waveguides 14, 15 of a fourth group interferes at the optical output 28 of the output optical coupler 22 with a fourth relative phase of about 180 degrees. For example, the third and fourth relative phase may be in the range of 180°±20° and are preferably in the range of 180°±10°.

In the second exemplary embodiments, the optical modulators 10C, 10D produce a signal point of a 16-QAM constellation for each state of the four EAMs. For the optical modulator 10C, the x and y coordinates of the signal points of the 16-QAM constellation of FIG. 2B and the states of the four EAMs are related as shown in Tables 3C and 3D.

TABLE 3C

| 16-QAM Optical modulator | x = 0 | x = 1 | x = −2 | x = −1 |
|---|---|---|---|---|
| EAM of waveguide 14 | OFF | ON | OFF | ON |
| EAM of waveguide 15 | OFF | OFF | ON | ON |

TABLE 3D

| 16-QAM Optical modulator | y = 0 | y = 1 | y = −2 | y = 1 |
|---|---|---|---|---|
| EAM of waveguide 11 | OFF | ON | OFF | ON |
| EAM of waveguide 12 | OFF | OFF | ON | ON |

For the optical modulator 10D, the states of the EAMs produce signal points of a 16-QAM constellation with a different center, C. For special configurations of the fixed optical waveguide 17, the center, C, of the 16-QAM constellation will be at or near (0, 0). In some such special configurations, the fixed optical waveguide 17 is configured to transmit to the optical output 28 of the output optical coupler 22 a light amplitude that is about $(½)^{1/2}$ of the maximum light amplitude transmitted thereto by each lower power controllable optical waveguide 11, 14, i.e., in their ON states or substantially transmitting states. For example, the fixed optical waveguide 17 may be configured to transmit to the optical output 28 of the output optical coupler 22, a light amplitude that is $(½)^{1/2}\pm20\%$ times the light amplitude transmitted thereto by each low power controllable optical waveguide 11, 14 in its ON state and preferably is $(½)^{1/2}\pm10\%$ times the light amplitude transmitted thereto by each low power controllable optical waveguide 11, 14 in its ON state. In these special configurations, the fixed optical waveguide 17 outputs light that interferes, at the optical output 28 of the output optical coupler 22, with relative phases of about 45 degrees with light output by the controllable optical waveguides 11, 14 of the group. For example, the magnitude of the relative phases may be in the range of 45°±20° and are preferably in the range of 45°±10°. In these special configurations, the optical modulator 10D typically transmits a lower time-averaged optical power during operation than the optical modulator 10C.

Also, the optical modulator 10D typically uses a lower time-averaged optical power in the special configurations of the second exemplary embodiments than in the special configurations of the first exemplary embodiments.

In different embodiments, the relative lateral positions of the waveguides 11, 12, 14, 15, 17 may be different. For example, the outside-to-inside lateral ordering of the waveguides 11, 12, 14, 15, 17 in the region between the optical couplers 20, 22 may differ in different embodiments.

32-QAM Optical Modulators

Figure 8:
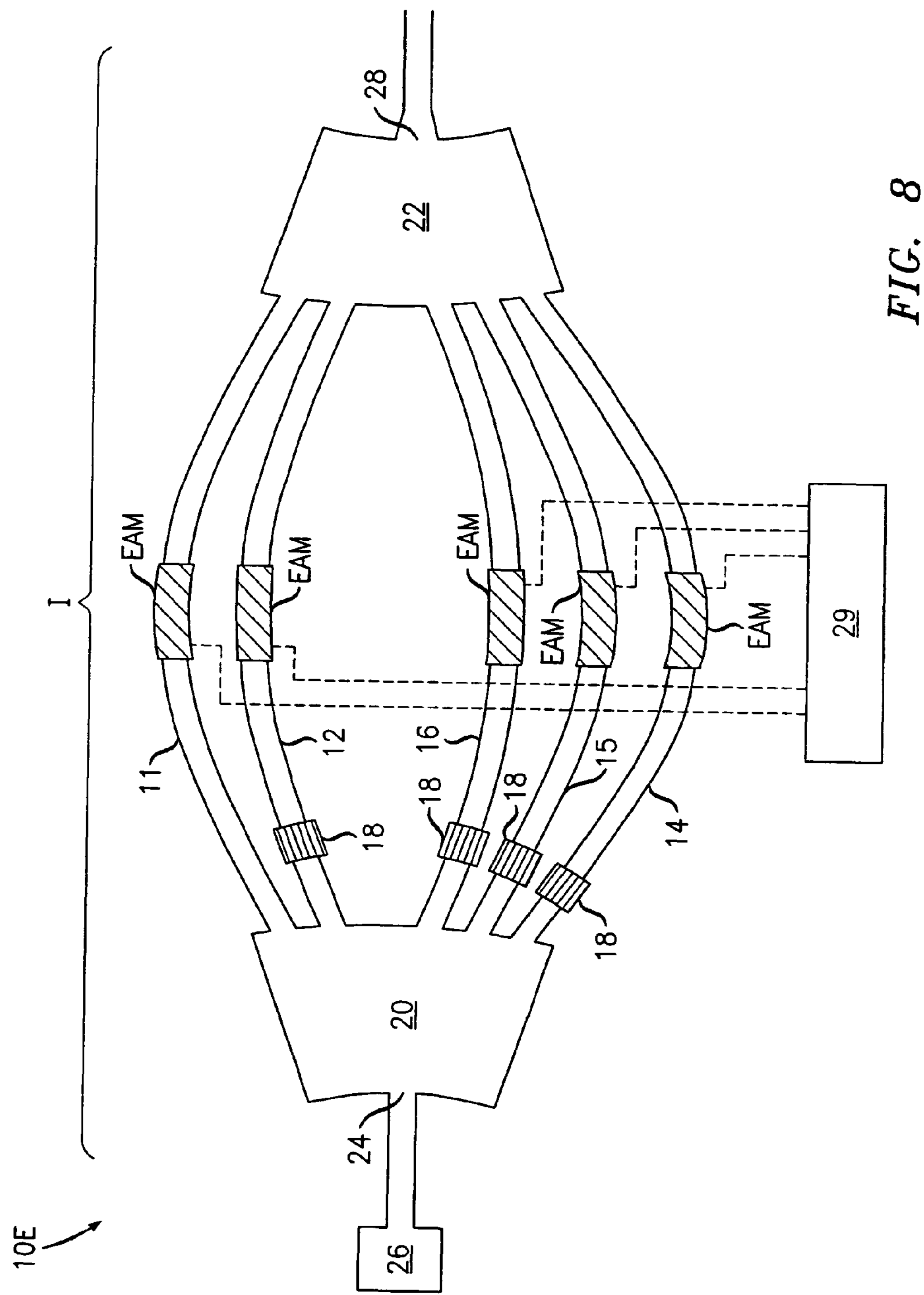
FIG. 8 is a top view of an embodiment of a 32-QAM optical modulator.
Figure 9:
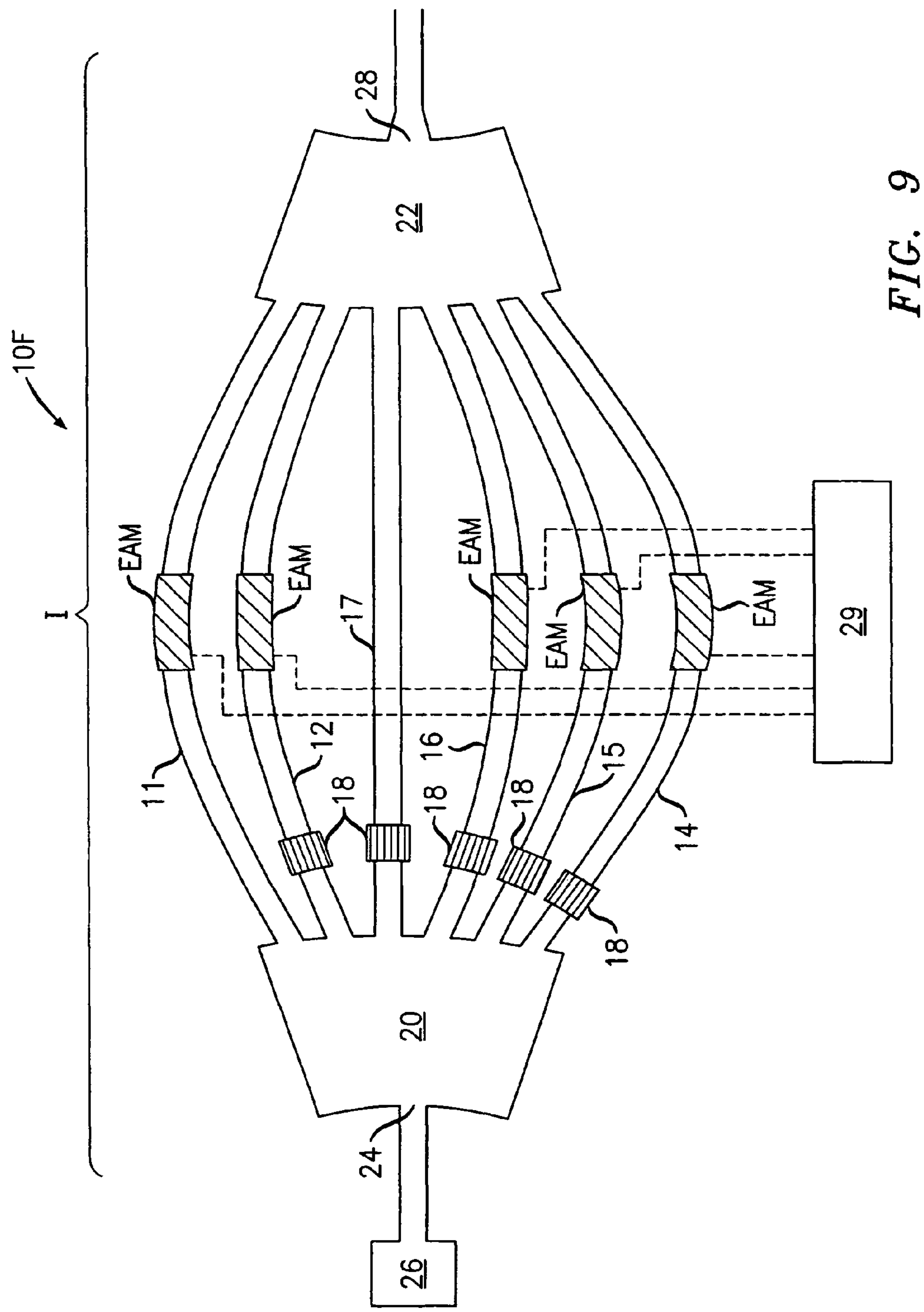
FIG. 9 is a top view of another embodiment of a 32-QAM optical modulator.

Referring to FIGS. 8-9, various embodiments of the optical modulators 10E-10F modulate data onto an optical carrier according to 32-QAM constellations.

A first exemplary embodiment sets internal light amplitudes and relative phases between interfered light as described below. With respect to light amplitudes, the highest power controllable optical waveguide 16 transmits, in its ON state, about twice as large a light amplitude to the optical output 28 of the output optical coupler 22 as is transmitted thereto by each individual controllable optical waveguides 12, 15 of a mid-power group transmit, in their ON states, and each individual controllable optical waveguide 12, 15 of the mid-power group transmits, in its ON state, to the optical output 28 of the output optical coupler 22 about twice a light amplitude transmitted thereto by each individual controllable optical waveguide 11, 14 of a low power group, in their ON states. With respect to relative phases, the light from the controllable optical waveguides 14, 15, 16 of a fourth group interfere at the optical output 28 of the output optical coupler 22 with the light from the controllable optical waveguides 11, 12 of a fifth group with a first relative phase of about 90 degrees. Also, light from the controllable optical waveguides 14, 15, 16 of the fourth group interferes at the optical output 28 of the output optical coupler 22 with a relative phase of about 0 degrees. Finally, light from the controllable optical waveguides 11, 12 of the fifth group interferes at the optical output 28 of the output optical coupler 22 with a relative phase of about 0 degrees.

In the first exemplary embodiment, the optical modulators 10E, 10F of FIGS. 8 and 9 produce a signal point of a 32-QAM constellation for each state of the five EAMs. For the optical modulator 10E, the x coordinates and the y coordinates of the signal points of the 32-QAM constellation of FIG. 3 and the states of the EAMs are related as shown in Tables 4A and 4B.

TABLE 4A

| 32-QAM modulator | x = 0 | x = 1 | x = 2 | x = 3 |
|---|---|---|---|---|
| EAM of waveguide 11 | OFF | ON | OFF | ON |
| EAM of waveguide 12 | OFF | OFF | ON | ON |

TABLE 4B

| 32-QAM modulator | y = 0 | y = 1 | y = 2 | y = 3 | y = 4 | y = 5 | y = 6 | y = 7 |
|---|---|---|---|---|---|---|---|---|
| EAM of waveguide 14 | OFF | ON | OFF | ON | OFF | ON | OFF | ON |
| EAM of waveguide 15 | OFF | OFF | ON | ON | OFF | OFF | ON | ON |
| EAM of waveguide 16 | OFF | OFF | OFF | OFF | ON | ON | ON | ON |

For the optical modulator 10F, the states of the EAMs produce the signal points of a 32-QAM constellation with a different center, C. For special configurations of the fixed optical waveguide 17, the center, C, of the 32-QAM constellation will be at or near (0, 0). In some such special configurations, the fixed optical waveguide 17 is configured to transmit to the optical output 28 of the output optical coupler 22 a light amplitude that is about $(29/2)^{1/2}$ times the light amplitude transmitted thereto by each lower power controllable optical waveguide 11, 14 in its ON state. In these special configurations, the fixed optical waveguide 17 outputs light that interferes, at the optical output 28 of the output optical coupler 22, with a relative phase of about arctan(7/3)+180°, i.e., about 246.8 degrees, with light output by the controllable optical waveguides 11, 12 of the fifth group. In the special configurations, the optical modulator 10F typically generates a lower time-averaged optical power during operation than the optical modulator 10E.

In different embodiments, the relative lateral positions of the waveguides 11-12 and 14-17 may be different. For example, the outside-to-inside ordering of the waveguides 11-12 and 14-17 in the region between the optical couplers 20, 22 may be different.

QAM Reflective Optical Modulators

Figure 10:
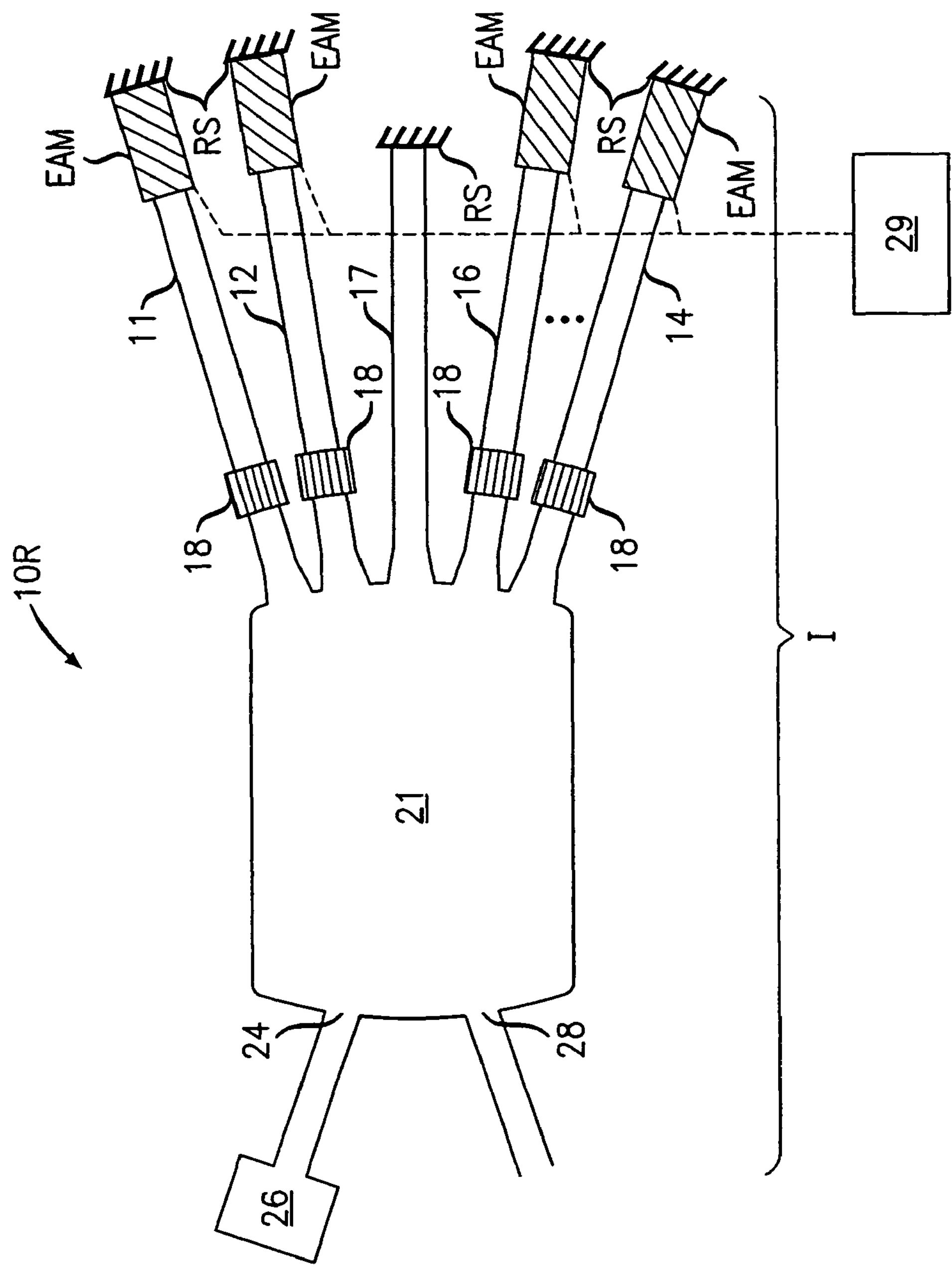
FIG. 10 is a top view illustrating an alternate optical modulator that operates similarly to the QAM optical modulators of FIGS. 4-9 but has only a single optical coupler.

FIG. 10 illustrates alternate embodiments of QAM optical modulators 10R that operate in manners similar to the optical modulators 10A-10F of FIGS. 4-9. The optical modulators 10R have a single optical star coupler 21 and two, three, or more controllable optical waveguides 11-16, and optionally have a fixed optical waveguide 17 and/or optional fixed phase shifters 18.

In the QAM optical modulator 10R, the optical star coupler 21 functions as both the input optical coupler 20 and the output optical coupler 22 of FIGS. 4-9. In particular, the optical star coupler 21 injects light from an optical input 24 into the optical waveguides 11-17 and injects light from the optical waveguides 11-17 into the optical output 28. The optical star coupler 21 has a single free space optical region for performing both of these optical injection functions. Each optical waveguide 11-17 includes a reflector or reflective surface, RS, at its second end. Thus, light received from the optical star coupler 21 at one end of one of the optical waveguides 11-17 is reflected back into to the optical star coupler 21 via the same optical waveguide 11-17. In other words, some of the received light propagates in the optical waveguides 11-17 in both forward and reverse directions due to intermediate reflections by the reflectors or reflective surfaces, RS. In other embodiments, the optical star coupler 21 may be replaced by another type of optical coupler, e.g., a multimode interference coupler.

In different embodiments, the QAM optical modulator 10R has different numbers of controllable optical waveguides 11-16. For embodiments of 4-QAM optical modulators, the QAM optical modulator 10R has the controllable optical waveguides 14, and optionally has the fixed optical waveguide 17. For embodiments of 8-QAM optical modulators, the QAM optical modulator 10R has the three controllable optical waveguides 11, 14, 15 and optionally has the fixed optical waveguide 17. For embodiments of 16-QAM optical modulators, the QAM optical modulator 10R has the four controllable optical waveguides 11, 12, 14, 15 and optionally has the fixed optical waveguide 17. For embodiments of 32-QAM optical modulators, the QAM optical modulator 10R has the five controllable optical waveguides 11, 12, 14, 15, 16 and optionally has the fixed optical waveguide 17. In each such embodiment, the present optical waveguides 11-17 are configured to transmit light amplitudes and relative phases to the optical output 28 of the optical star coupler 21 as described above for the same optical waveguides 11-17 in the exemplary embodiments of the optical modulators 10A-10F of FIGS. 4-9. Also, in these embodiments of the optical modulator 10R, the EAMs are operated to be in either an ON-state, i.e., a substantially transmitting state, or in an OFF-state, i.e., a substantially blocking state, as already described with respect to the 4-QAM to 32-QAM optical modulators of FIGS. 4-9.

Operating QAM Optical Modulators

Figure 11:
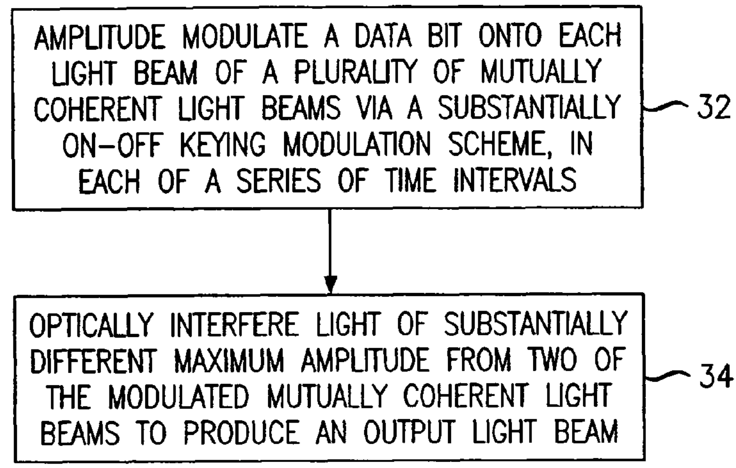
FIG. 11 is a flow chart for a method of performing optical modulation according to QAM constellations with four of more symbols, e.g., using the optical modulators of FIGS. 4-10.

FIG. 11 illustrates a method 30 of operating an optical modulator according to a $2^M$-QAM modulation protocol where M≧2 or M≧3. For example, the method 30 may be performed to operate the optical modulators 10A-10F, 10R of FIGS. 4-10.

The method 30 includes amplitude modulating a data bit onto each light beam of a plurality of mutually coherent light beams via a substantially ON-OFF keying modulation scheme, i.e., in each of a series of time intervals (step 32). The light beams of the plurality may be produced by splitting a coherent light beam into the mutually coherent optical beams that are received by the controllable optical waveguides 11-16 of FIGS. 4-10, e.g., from the input optical coupler 20 or the optical coupler 21. The substantially ON-OFF keying modulation may be performed by the EAMs of FIGS. 4-10.

The method 30 includes optically interfering light of substantially different maximum amplitude from two or more of the modulated mutually coherent optical beams to produce an output light beam, e.g., at the optical output 28 of the output optical coupler 22 or the optical coupler 21 of FIGS. 4-10 (step 34). The interfered light of the two or more of the mutually coherent light beams may have substantially different maximum amplitudes. In particular, the interfered light from at least two of the light beams may have maximum amplitudes that differ by a factor of about two, e.g., a factor of 1.5 to 2.5 and preferably a factor of 1.8 to 2.2. The output light beam carries, two, three, or more bits of data per symbol, i.e., per modulation interval. The output optical beam carries a temporal sequence of data modulated thereon according to a QAM modulation protocol. The interfering step 34 may also include interfering the light of the modulated mutually coherent light beams with the light of another mutually coherent light beam that has a temporally constant amplitude, e.g., a light beam output from the fixed optical waveguide 17 in FIGS. 5, 7, 9, and 10.

In various embodiments, the modulated light beams have preselected relative phases when interfered to produce the output light beam. Producing the output light beam often involves interfering two of the modulated mutually coherent light beams with a relative phase of about 90 degrees, e.g., a relative phase in the range of 90±20 degrees or preferably is in the range of 90±10 degrees. Producing the output light beam may also involve interfering two of the modulated mutually coherent light beams with a relative phase difference of about 0, e.g., a relative phase in the range of 0±20 degrees and preferably is in the range of 0±10 degrees, or with a relative phase difference of about 180, e.g., a relative phase in the range of 180±20 degrees and preferably in the range of 180±10 degrees. The production of output light beams by interfering modulated light beams with such relative phases has been already described for the QAM embodiments of the optical modulators 10A-10F, 10R as shown in FIGS. 4-10.

While several examples of optical modulators are described above and in FIGS. 4-10, the invention is intended to have a scope that would cover modifications of the described embodiments, e.g., wherein the modifications would be understood by a person of skill in the art in light of the disclosure herein.

Exemplary Integrated Optical Modulators

Figure 12:
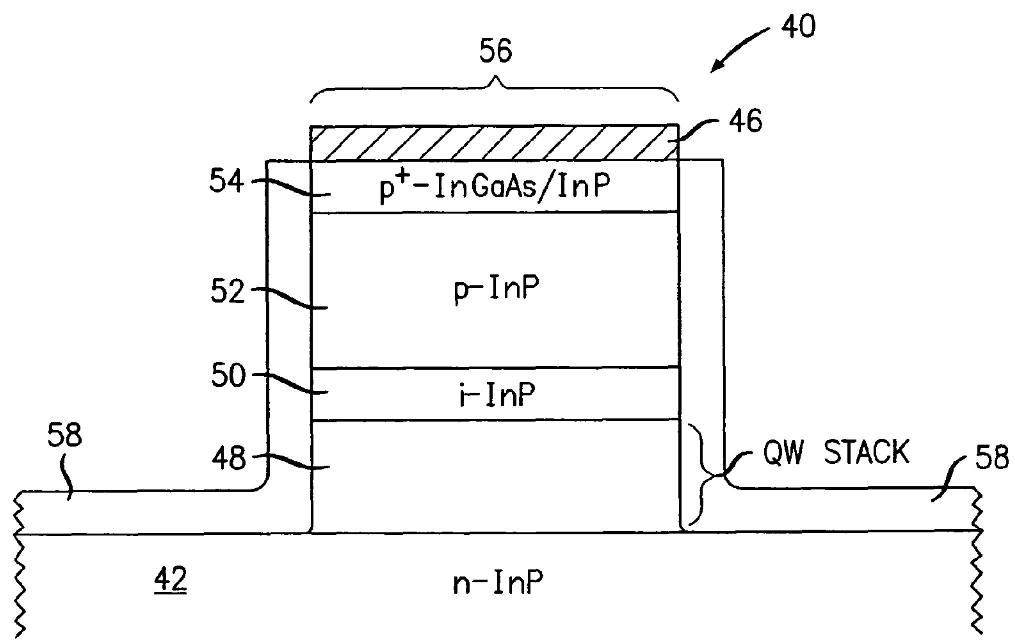
FIG. 12 is a cross-sectional view of an exemplary planar structure for the optical modulators of FIGS. 4-10.
Figure 13:
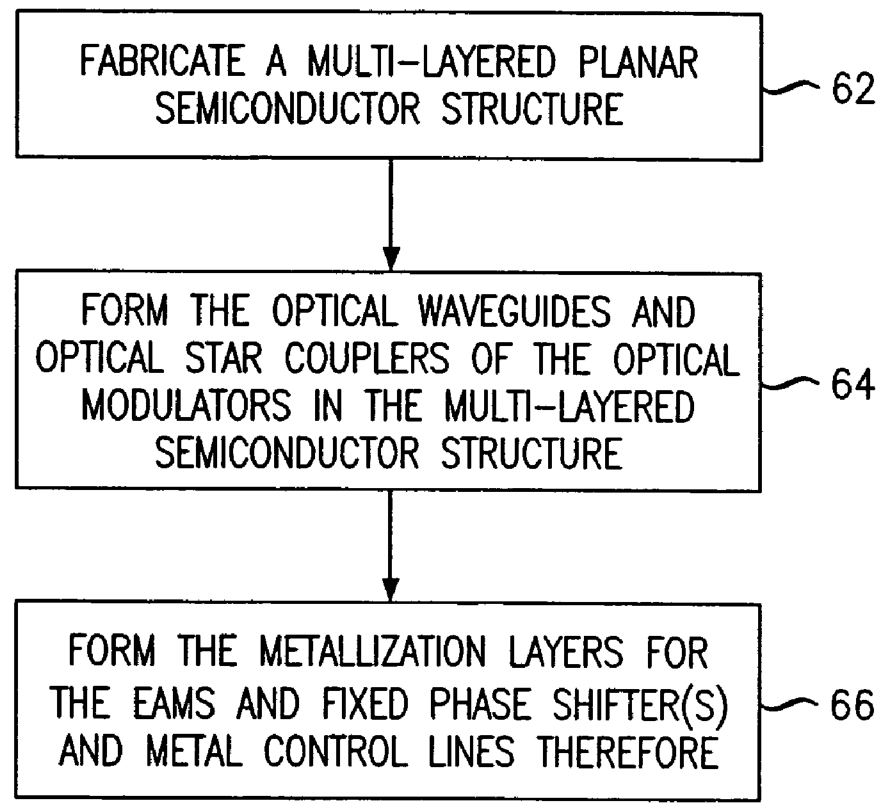
FIG. 13 is a flow chart illustrating one method of making the exemplary structure of FIG. 12.

FIG. 13 illustrates a method for fabricating an integrated optoelectronic structure 40 as shown in FIG. 12. The integrated optoelectronic structure 40 is an exemplary planar structure for the optical modulators 10A-10F, 10R of FIGS. 4-10.

The optoelectronic structure 40 is based on the quantum-confined Stark effect in some group III-V semiconductors. In particular, InP has a strong electro-absorption effect that allows the fabrication of EAMs having substantially ON-OFF optical keying behavior over short interaction distances when operated by low control voltages. In the semiconductor structure 40, the optical extinction ratio may be improved by a stack of group III-V quantum well (QW) structures. In the semiconductor structure 40, optical waveguide segments having a length of about 0.1 millimeters may provide high optical extinction ratios for low control voltages. The smallness of such EAMs enables their operation as lumped electrical devices at high speeds and thus, can enable their use in compact embodiments of the optical modulators 10A-10F, 10R.

The method 60 for fabricating the integrated optoelectronic structure 40 includes several steps.

First, the method 60 includes fabricating a multi-layered semiconductor structure via conventional microelectronics processes (step 62). The multi-layered semiconductor structure is formed on an n-type doped indium phosphide (InP) substrate 42 made, e.g., by epitaxially growing a layer of n-type InP on an ordinary InP wafer-substrate. The layer of n-doped InP may have a thickness of about 0.75 μm and be doped by about $1\times10^{18}$ silicon (Si) atoms per centimeter cubed. The multi-layered semiconductor structure includes a group III-V semiconductor layer series 44 that is located on the n-type InP substrate 42, and a top multi-layer metal electrode 46 that is on some lateral portions of the group III-V semiconductor layer series 44. The metal electrode 46 overlies portions of group III-V semiconductor layer series 44 where EAMs, fixed phase shifters 18, and metallic lines will be constructed. From bottom to top, the group III-V semiconductor layer series 44 includes a vertical QW stack 48, a layer 50 of about 125 nm of intrinsic (i) InP, a layer 52 of about 1.3 μm p-type InP, and a top multilayer 54 of about 150 nm of p++-type InGaAsP on about 150 nm of p+-type InP. The group III-V semiconductor layer series 44 may be formed by performing conventional epitaxial growth processes known to persons of skill in the microelectronics arts.

The vertical QW stack 48 includes a top confinement heterostructure, a vertical sequence of about eight quantum wells and barriers, and a bottom confinement heterostructure and is not intentionally doped. That is, the vertical QW stack 48 is constructed of intrinsic semiconductor.

In the vertical QW stack 48, each QW includes a well layer of about 8 nanometers (nm) of intrinsically doped $In_{1-x}Ga_xAs_{1-z}P_z$, and barrier layers of about 9 nm of intrinsically doped $In_{1-x'}Ga_{x'}As_{1-z'}P_{z'}$, which are located on each side of the well layer. The stack 48 has alternating barrier and well layers and has a barrier layer at its top and bottom extremities. The well and barrier layers have different group III-V alloy composition parameter sets [x, z] and [x', z']. In the well layers, the alloy compositions x and z are selected to produce a bandgap whose energy is about equal to that of a photon with a wavelength of about 1.56 μm. In the well layers, the alloy compositions x and z are also selected to put the well layers under a tensile strain of about −0.3%. In the well layers, an exemplary set of alloy parameters is x=0.474 and z=0.09. In the barrier layers, the alloy compositions x' and z' are selected to produce a bandgap whose energy is about equal to that of a photon with a wavelength of about 1.25 μm. In the barrier layers, the alloy compositions x' and z' are also selected to put the barrier layers under a compressive strain of about +0.2%. In the barrier layers, an exemplary set of alloy parameters is x'=0.21 and z'=0.495.

The confinement heterostructures aid to vertically confine an optical mode, i.e., by effectively increasing the thickness of the core of the planar waveguide structure. The confinement heterostructures may be, e.g., layers of $In_{1-x''}Ga_{x''}As_{1-z''}P_{z''}$ that are about 15 nm thick. The confinement heterostructures can have the same alloy compositions as the barrier layers of the QWs.

The vertical stack 48 of QWs has a band edge at about 1.56 μm, and is switchable, i.e., via low control voltages. In particular, the vertical stack 48 can be switched between an OFF state, for which light in a wavelength range of the optical telecommunications C-band is substantially absorbed, and an ON state, for which light in the same wavelength range of the optical telecommunications C-band is substantially transmitted.

The p-type InP layer 52 has a concentration of p-type dopant atoms that is graded from a value near the dopant concentration in the intrinsic InP layer 50 to a value near the dopant concentration in the p+-type InP layer of the multilayer 54. For example, the p-type InP layer 52 may be doped by Zn atoms at a concentration that varies approximately linearly with the layer thickness from a value of about $5\times10^{17}$ Zn atoms per centimeter cubed at the bottom of the p-type InP layer 52 to a value of about $2\times10^{19}$ Zn atoms per centimeter cubed at the top of the p-type InP layer 52.

The top multilayer 54 is a heavily p-doped to function as an electrode for lateral portions of the integrated optical structure 40 that will be the EAMs and fixed optical phase shifters 18 in the optical modulators 10A-10F, 10R of FIGS. 4-10. In top multilayer 54, the p++-type cap layer of InGaAs may be doped with about $2\times10^{19}$ zinc (Zn) atoms per centimeter cubed, and the p+-type layer of InP may be doped with about $2\times10^{18}$ Zn atoms per centimeter cubed.

Next, the method 60 includes performing a sequence of substeps to form the two or more controllable optical waveguides 11-16, the optional fixed optical waveguide 17, and the optical couplers 20, 21, 22 of the optical modulators 10A-10F, 10R in the multi-layered semiconductor structure formed at above step 62 (step 64). The sequence of substeps includes removing the p+-type InGaAs/InP layer 54 over intended passive lateral portions of the layered structure, e.g., portions that are lateral to those intended for fabricating the EAMs and the fixed phase shifters 18. Next, the sequence of substeps includes performing a reactive-ion etch of the remaining multi-layer structure, wherein etch stops on the n-doped InP substrate 42 and is controlled by a silica mask. The dry etch produces the lateral boundaries of ridges 56 for the optical waveguides 11-17, the optical couplers 20, 21, 22, and the optical inputs and outputs 24, 28 thereof. Exemplary optical waveguides 11-17 have widths of about 1.8 μm away from the optical couplers 20, 21, 22. Finally, the sequence of substeps involves spinning on a benzocyclobutene (BCB) layer 58 over the etched structure and then, curing the spun on layer 58 to complete the fabrication of the lateral optical structures of the QAM optical modulators 10A-10F, 10R.

Next, the method 60 includes performing a sequence of substeps to form the metallization layers for the EAMs, fixed phase shifters 18 and metal control lines thereof (step 66). First, a conventional etch is performed through the BCB over areas where metallization layers will be deposited. This etch stops on the p+-type InGaAs layer 54. Next, electrodes and metal control lines, e.g., gold-titanium multi-layers, are formed on the exposed portions of the structure. This metallization process may involve, e.g., performing a conventional deposition and lift-off process. Finally, the backside of the n-type InP substrate is thinned and a back-side metallization is performed to form metallic ground planes, e.g., conventional gold-titanium multi-layers.

The method 60 may also include producing the reflectors or reflective surfaces, RS, of the optical modulator 10R. The reflective surfaces are produced by techniques known to persons of skill in the microelectronics art, e.g., cleaving.

In the structure 40, the EAMs, fixed phased shifters 18, control lines and passive portions of optical waveguides were made with the stack of QWs to simplify fabrication.

It may however, be desirable to modify this structure to reduce losses by removing the stacks of QWs in passive lateral portions of the optical modulators 10A-10F, 10R of FIGS. 4-10.

Other embodiments of the structure 40 of FIG. 12 may have QWs with different bandgaps. The different bandgaps would enable the other embodiments to operate in wavelength ranges that differ from the telecommunications C-Band.

In some embodiments, the optical modulators 10A-10F, 10R and the laser source 26 of FIGS. 4-10 may be fabricated on the same InP substrate.

In embodiments of the optical modulators 10B, 10D, 10F, 10R that include the fixed optical waveguide 17, the light amplitude transmitted by the fixed optical waveguide 17 to the optical coupler 21, 22 may be increased or decreased so that a time-averaged power consumption is low even though the EAMs of the controllable optical waveguides 11-16 have poor extinction ratios.

The invention is intended to include other embodiments that would be obvious to one of skill in the art in light of the description, figures, and claims.

What is claimed is:

1. A method, comprising:

in each of a series of time intervals, modulating a data bit onto each light beam of a plurality of mutually coherent light beams via a binary amplitude modulation scheme; and optically interfering light from the modulated mutually coherent light beams to produce an output light beam, the interfered light from two of the modulated mutually coherent light beams having substantially different maximum amplitude.

2. The method of claim 1, wherein the maximum amplitude of the interfered light of one of the modulated mutually coherent light beams is between 1.5 and 2.5 times the maximum amplitude of the interfered light from another of light beams.

3. The method of claim 2, wherein the interfering includes interfering the modulated mutually coherent light beams with another mutually coherent light beam having a substantially temporally constant intensity.

4. The method of claim 2, wherein the interfering includes interfering the light of the two of the mutually coherent light beams with a relative phase whose magnitude is less than 20 degrees.

5. The method of claim 1, wherein the interfering includes interfering the light of first and second of the mutually coherent light beams with a relative phase of between 160 degrees and 200 degrees.

6. The method of claim 5, wherein the interfering includes interfering the light of third and fourth of the mutually coherent light beams with a relative phase whose magnitude is less than 20 degrees.

7. The method of claim 1, further comprising transmitting light of each light beam of the plurality through a corresponding one of the controllable optical waveguides in both forward and backwards directions.

* * * * *